United States Patent
Collazo-Martinez et al.

(10) Patent No.: US 8,206,511 B2
(45) Date of Patent: Jun. 26, 2012

(54) DAILY CLEANER WITH SLIP-RESISTANT AND GLOSS-ENHANCING PROPERTIES

(75) Inventors: Melissa Collazo-Martinez, Greensboro, NC (US); Minyu Li, Oakdale, MN (US); Robert D. Hei, Baldwin, WI (US)

(73) Assignee: Ecolab USA Inc., St. Paul, MN (US)

( * ) Notice: Subject to any disclaimer, the term of this patent is extended or adjusted under 35 U.S.C. 154(b) by 345 days.

(21) Appl. No.: 12/574,175

(22) Filed: Oct. 6, 2009

(65) Prior Publication Data
US 2011/0079246 A1 Apr. 7, 2011

(51) Int. Cl.
*B08B 7/00* (2006.01)
(52) U.S. Cl. ............ 134/6; 510/240; 510/295; 510/296; 510/438
(58) Field of Classification Search ...... 134/6; 510/240, 510/295, 296, 438
See application file for complete search history.

(56) References Cited

U.S. PATENT DOCUMENTS

| | | | |
|---|---|---|---|
| 2,674,619 A | 4/1954 | Lundsted | |
| 2,677,700 A | 5/1954 | Jackson et al. | |
| 2,903,486 A | 9/1959 | Brown et al. | |
| 2,972,592 A | 2/1961 | Brown et al. | |
| 3,048,548 A | 8/1962 | Martin et al. | |
| 3,308,078 A | 3/1967 | Rogers et al. | |
| 3,382,178 A | 5/1968 | Lissant et al. | |
| 3,574,124 A | 4/1971 | Lyness et al. | |
| 3,664,961 A | 5/1972 | Norris | |
| 3,785,860 A | 1/1974 | Zdanowski | |
| 3,793,275 A | 2/1974 | Corey et al. | |
| 3,917,552 A | 11/1975 | Bischoff et al. | |
| 3,929,678 A | 12/1975 | Laughlin et al. | |
| 4,017,662 A | 4/1977 | Gehman et al. | |
| 4,363,753 A | 12/1982 | Bozon et al. | |
| 4,363,756 A | 12/1982 | Sepulveda et al. | |
| 4,565,647 A | 1/1986 | Llenado | |
| 4,613,679 A | 9/1986 | Mainord | |
| 4,725,319 A | 2/1988 | Osberghaus | |
| 4,869,934 A | 9/1989 | Jethwa | |
| 4,877,691 A | 10/1989 | Cockrell, Jr. | |
| 4,909,962 A | 3/1990 | Clark | |
| 5,137,793 A | 8/1992 | Cockrell, Jr. | |
| 5,290,954 A | 3/1994 | Roberts et al. | |
| 5,407,700 A | 4/1995 | Man et al. | |
| 5,458,532 A | 10/1995 | Cannone | |
| 5,460,887 A | 10/1995 | Pechhold | |
| 5,605,493 A | 2/1997 | Donatelli et al. | |
| 5,683,143 A | 11/1997 | Peterson et al. | |
| 5,707,708 A | 1/1998 | Pechhold | |
| 5,753,604 A | 5/1998 | Soldanski et al. | |
| 5,834,088 A | 11/1998 | Pechhold | |
| 5,945,472 A | 8/1999 | Duong et al. | |
| 6,180,592 B1 | 1/2001 | Smith et al. | |
| 6,223,383 B1 | 5/2001 | VanPutten | |
| 6,234,886 B1 | 5/2001 | Rivard et al. | |
| 6,261,164 B1 | 7/2001 | Rivard et al. | |
| 6,403,546 B1 | 6/2002 | Hernandez et al. | |
| 6,701,940 B2 | 3/2004 | Tsibouklis et al. | |
| 6,716,805 B1 * | 4/2004 | Sherry et al. .................. | 510/295 |
| 7,033,258 B2 | 4/2006 | Jordan | |
| 7,132,479 B2 | 11/2006 | Engelhardt et al. | |
| 7,204,745 B2 | 4/2007 | Thysell | |
| 7,465,774 B1 | 12/2008 | Schade et al. | |
| 7,550,199 B2 | 6/2009 | Hopkins et al. | |
| 7,655,609 B2 | 2/2010 | Torres et al. | |
| 7,776,108 B2 | 8/2010 | Shah et al. | |
| 2002/0166573 A1 * | 11/2002 | Policicchio et al. ............. | 134/6 |
| 2002/0168216 A1 * | 11/2002 | Policicchio et al. ........... | 401/270 |
| 2002/0175092 A1 * | 11/2002 | Stulens et al. ................. | 206/229 |
| 2003/0034050 A1 * | 2/2003 | Policicchio et al. ............. | 134/6 |
| 2003/0126709 A1 * | 7/2003 | Policicchio et al. ............ | 15/228 |
| 2003/0126710 A1 * | 7/2003 | Policicchio et al. ............ | 15/228 |
| 2003/0127108 A1 * | 7/2003 | Policicchio et al. ............. | 134/6 |
| 2004/0086320 A1 * | 5/2004 | Policicchio et al. ........... | 401/138 |
| 2005/0096239 A1 | 5/2005 | Barnabas et al. | |
| 2005/0113277 A1 * | 5/2005 | Sherry et al. .................. | 510/438 |
| 2005/0153857 A1 * | 7/2005 | Sherry et al. .................. | 510/295 |
| 2005/0172428 A1 | 8/2005 | Thysell | |
| 2006/0128585 A1 | 6/2006 | Adair et al. | |
| 2006/0160953 A1 | 7/2006 | Wautier et al. | |

(Continued)

FOREIGN PATENT DOCUMENTS

EP 0 449 509 10/1991

(Continued)

OTHER PUBLICATIONS

Friction™ Slip Resistant Cleaner & Polish, Nu-Safe Floor Solutions, Inc., printed Oct. 5, 2004, 1 page.

(Continued)

*Primary Examiner* — Gregory Webb
(74) *Attorney, Agent, or Firm* — Andrew D. Sorensen; Amy J. Hoffman

(57) ABSTRACT

A method of cleaning an uncoated surface includes providing a composition having a pH of between about 7 and about 11 and applying the composition to the uncoated surface. The composition includes a fatty acid salt constituting between about 5% and about 40% by weight of the composition, a gloss-enhancing agent constituting between about 0.1% and 20% by weight of the composition, an anti-slip agent constituting between about 0.5% and about 10% by weight of the composition, and water constituting between about 20% and about 94.6% by weight of the composition. The composition can be applied at least three times a week.

9 Claims, No Drawings

U.S. PATENT DOCUMENTS

| | | | |
|---|---|---|---|
| 2006/0211340 | A1 | 9/2006 | Thysell |
| 2007/0099549 | A1 | 5/2007 | Palushaj |
| 2007/0128989 | A1 | 6/2007 | Jentgens et al. |
| 2007/0207922 | A1 | 9/2007 | Haindl et al. |
| 2007/0215184 | A1 | 9/2007 | Jonke et al. |
| 2008/0146734 | A1 | 6/2008 | Youngblood et al. |
| 2008/0248989 | A1 | 10/2008 | Holderbaum et al. |
| 2008/0313819 | A1 | 12/2008 | Penninger et al. |
| 2009/0170744 | A1 | 7/2009 | Meine et al. |
| 2009/0311302 | A1 | 12/2009 | Youngblood et al. |
| 2009/0317621 | A1 | 12/2009 | Youngblood et al. |
| 2010/0004152 | A1 | 1/2010 | Karagianni et al. |

FOREIGN PATENT DOCUMENTS

| | | | |
|---|---|---|---|
| EP | 0 627 281 | | 12/1994 |
| EP | 0 458 591 | | 10/1995 |
| EP | 0562730 | B1 | 10/1996 |
| EP | 0 845 326 | | 6/1998 |
| EP | 1 292 428 | | 4/2005 |
| EP | 1 186 379 | | 2/2006 |
| EP | 1 524 077 | | 8/2006 |
| EP | 1 702 714 | | 5/2007 |
| GB | 0973294 | A | 10/1964 |
| GB | 1082153 | A | 9/1967 |
| GB | 1141943 | A | 2/1969 |
| GB | 1163852 | A | 9/1969 |
| GB | 1 528 592 | | 10/1978 |
| JP | 1148416 | A | 2/1999 |
| JP | 2001192983 | A | 7/2001 |
| JP | 2005/023149 | | 1/2005 |
| WO | WO 94/20264 | | 9/1994 |
| WO | WO2001023518 | A1 | 4/2001 |
| WO | WO2005071030 | A2 | 8/2005 |
| WO | WO2006021529 | A1 | 3/2006 |
| WO | WO 2006/097141 | | 9/2006 |
| WO | WO2007117952 | A1 | 10/2007 |
| WO | WO2009074124 | A2 | 6/2009 |

OTHER PUBLICATIONS

Clyde Hygiene Company, Norfresh Concentrated Floor Maintainer, printed Jan. 2, 2008, 2 pages.
Floortop Floor Cleaner & Maintainer, Concentrated cleaner for cleaning and maintenance of hard floors, www.pgprof.com, 1 page.
Floor Safety Products, Copyright © 2006 Xtreme Traction, 3 pages.
Slip Control, R20 Floor Cleaner-Polisher-Non-Slip, Copyright © 2004 SlipControl.com, last modified Mar. 15, 2006, 4 pages.
Stop Slip Floor Cleaner and Traction Treatment, manufactured by Johnson Diversey, © 2006 Dadepaper Company, 1 page.
International Search Report and Written Opinion issued in PCT/IB2010/054508, dated Jul. 27, 2011, 8 pages.
Chen, Wei et al., "Ultrahydrophobic and Ultralyophobic Surfaces: Some Comments and Examples", langmuir, Apr. 24, 1999, 15 (10), pp. 3395-3399. http://pub.acs.org.proxy.lib.uiowa.edu/doi/full/1 0.1 021/1 a990074s, [retrieved on Aug. 24, 2011].
GreenerDesign Staff, "Purdue Scientists Develop 'Self-Cleaning' Coatings that Repel Oil", GreenerDesign Staff, Created Aug. 18, 2009; http://www.greenbiz.com/prinU270n, 2 pages, [retrieved on Aug. 20, 2010].
Howarter, John A. et al., "Amphiphile grafted membranes for the separation of oil-in-water dispersions", Journal of Colloid and Interface Science 329 (2009) 127-132 (published online Oct. 1, 2008).
Howarter, John A. et al., "Hydrophilic-oleophobic stimuli-responsive materials and surfaces" Abstract, 1 page, http://docs.lib.purdue.edu/dissertations/AAI3373153/, [retrieved on Aug. 24, 2011].

Howarter, John A. et al., "Oleophobic membranes of enhanced coalescence and separation in oil-in-water systems" POLY 7, Abstract, 1 page, Aug. 16, 2009, http://oasys2.confex.com/acs/238nm/techprogram/P1299044.htm, retrieved on Aug. 23, 2011].
Howarter, John A. et al., "Self-Cleaning and Anti-Fog Surfaces via Stimuli-Responsive Polymer Brushes**'" Adv. Mater. Oct. 31, 2007, 19,3838-3843.
Howarter, John A. et al., "Self-Cleaning and Next Generation Anti-Fog Surfaces and Coatings", Macromol. Rapid Commun. 2008, 29, 455-466.
Howarter, John A. et al., "Surface Modification of Polymers with 3-Aminopropyltriethoxysilane as a General Pretreatment for Controlled Wettability", Macromolecules, Jan. 30, 2007, 40, 1128-1132.
Howarter, John A. et al., "Surfactant modified membranes for the separation of oil-in-water emulsions" POLY 705, Abstract, 1 page, Apr. 10, 2008, http://oasys2.confex.com/acs/235nm/techprogram/P11150723.htm, [retrieved on Aug. 24, 2011].
Howarter, John A. et al., "Synthesis and characterization of bulk self-cleaning polymers" POLY 104 Abstract, 1 page, Apr. 6, 2008, http://oasys2.confex.com/acs/235nm/techprogram/P1139556.htm, [retrieved on Aug. 24, 2011].
Ober, Christopher K. et al., "Block copolymers as surface modifiers: Synthesis, characterization, and relevance to fouling release and biostability" PMSE 353 Abstract, 1 page, Mar. 27, 2003, http://oasys2.confex.com/acs/225nm/techprogram/P609111.htm, [retrieved on Aug. 24, 2011].
Ober, Christopher K. et al., "Surface-Active Materials with Antifouling Properties", Proceedings published 2004 by the American Chemical Society, 2 pages.
Stratton, Thomas R. et al, "In Vitro Biocompatibility Studies of Antibacterial Quaternary Polymers" Biomacromolecules Aug. 27, 2009, 10, 2550-2555.
Stratton, Thomas R. et al., "Activity and biocompatibility of poly(vinyl pyridine)-based copolymers" PMSE 207 Abstract, Apr. 8, 2008, 1 page, http://oasys2.confex.com/acs/235nm/techprogram/P1158850.htm, [retrieved on Aug. 24, 2011].
Stratton, Thomas R. et al., "Biocompatibility of quaternary poly(vinyl pyridine)-based bactericidal copolymers as determined by invitro assays of human epithelium" POLY 180 Abstract, 1 page, Aug. 17, 2009, http://oasys2.confex.com/acs/238nm/techprograrn/P1297760.htm, [retrieved on Aug. 23, 2011].
Youngblood, Jeffrey P. et al., "Coatings Based on Side-chain Ether-linked Poly(ethylene glycol) and Fluorocarbon Polymers for the Control of Marine Biofouling", Biofouling, Apr. 19, 2003, vol. 19 (Supplement), pp. 91-98.
Youngblood, Jeffrey P. et al., "Plasma polymerization using solid phase polymer reactants (non-classical sputtering of polymers)", Thin Solid Films, vol. 382, Issues 1-2, Feb. 14, 2001, pp. 95-100.
Youngblood, Jeffrey P. et al., "Bioinspired Materials for Self-Cleaning and Self-Healing" MRS Bulletin, vol. 33, Aug. 2008, www.mrs.org/bulletin, pp. 732-741.
Youngblood, Jeffrey P. et al., "Hydrophilic and oleo phobic stimuli-responsive surfaces" POLY 76 Abstract, 1 page, Mar. 25, 2007, http://oasys2.confex.com/acs/233nm/techprogram/P1 049953.htm, [retrieved on Aug. 24, 2011].
Youngblood, Jeffrey P. et al., "New materials for marine biofouling resistance and release: Semifluorinated and PEGylated block copolymer bilayer coatings" PMSE 351 Abstract, 1 page, Mar. 27, 2003, http://oasys2.confex.com/acs/225nm/techprogram/P595545.htm, [retrieved on Aug. 24, 2011].

* cited by examiner

DAILY CLEANER WITH SLIP-RESISTANT AND GLOSS-ENHANCING PROPERTIES

FIELD OF THE INVENTION

The present invention relates generally to the field of detergent compositions for cleaning a hard surface. In particular, the present invention relates to a detergent composition that increases the anti-slip and gloss properties of a surface and that is safe to apply daily. The present invention also relates to methods of employing these detergent compositions.

BACKGROUND

Various substrate materials can be used for flooring including marble, granite, terrazzo, concrete, dry shake, ceramic tiles, wood, laminate, linoleum, vinyl, cork, bamboo and rubber. A clean, shiny and non-slip stone floor surface is desirable to consumers. Stone surfaces are often polished for a glossy appearance and then maintained through a cleaning process, such as daily cleaning with a daily cleaner or daily cleaner/conditioner. As the surface of the floor is polished, the gloss tends to decrease with time and/or use. To restore the glossy appearance of stone surfaces, the surface is typically first treated with a polish restoration agent using a floor machine under wet conditions. After being treated with the polish restoration agent, the residue of the polish restoration agent is removed through water rinses. Generally, different polish restoration agents are used depending on the type of surface substrate that is being polished. For example, a marble polishing compound is used for marble surface polishing while a granite polishing cream is used for granite surface polishing.

While this method is effective in providing a glossy and smooth texture to the surface, the polishing may lower the coefficient of friction of the surface. The coefficient of friction of a polished surface may also be reduced during use (such as through traffic on the surface or contamination of the surface). The reduction of the coefficient of friction of a surface can result in a slippery surface that may cause accidental slips and falls. To increase the safety of users walking on the surface, an anti-slip or slip-resistant agent can be applied to the surface to increase the coefficient of friction of the surface. Most slip resistant treatments are applied separately from the cleaning and polishing processes. To treat the surface, the surface is first cleaned with a dust mop and then a slip resistant agent is applied. Optionally, after the surface is treated with the slip agent, the surface can be buffed with pads.

SUMMARY

The present invention relates to detergent compositions for cleaning, enhancing gloss and increasing anti-slip properties of a surface. The present compositions can be applied to the surface daily. The present invention also relates to methods employing these compositions.

In an embodiment, the present invention is a method of cleaning an uncoated stone surface. The method includes providing a concentrated composition having a pH of between about 7 and about 11 and applying the composition to the uncoated surface at least three times a week. The composition includes a fatty acid amine salt (soap) constituting between about 4% and about 50% by weight of the composition, a gloss-enhancing agent constituting between about 0.1% and 20% by weight of the composition, an anti-slip agent constituting between about 0.5% and about 10% by weight of the composition, and water constituting between about 20% and about 95.4% by weight of the composition.

In an embodiment, the present invention is a method of cleaning a surface to enhance gloss and anti-slip properties of the surface. The method includes providing a composition having a pH of between about 7 and about 11 and applying the composition onto the surface. The composition includes a cleaning agent including a fatty acid amine salt, a gloss enhancement agent including film-forming polymeric materials, an anti-slip agent and water. The composition dries within between about 15 and about 30 minutes of when the composition is applied to the surface.

In another embodiment, the present invention is an anti-slip and gloss enhancing detergent composition including a fatty acid amine-based detergent constituting between about 4% and about 50% by weight of the composition, a gloss-enhancing agent constituting between about 0.1% and about 20% by weight of the composition, an anti-slip agent constituting between about 0.5% and about 10% by weight of the composition, and water constituting between about 20% and about 95.4% by weight of the composition.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

The present invention relates to detergent compositions with gloss enhancing and slip resistant properties that are environmentally safe for daily use. The detergent compositions of the present invention may be employed in any of a wide variety of situations in which it is desired to reduce overall labor when cleaning or/and maintaining a surface, such as a floor. The detergent compositions increase the overall gloss appearance of the surface when measured at a 20 or 60 degree angle. The detergent compositions also increase the slip resistance of the surface by increasing the coefficient of friction of the floor, which may reduce the number of slips or falls on the surface. While the detergent compositions are discussed as being applied to uncoated floors (e.g. not coated with floor finishes) such as polished and unpolished marble, polished and unpolished concrete, terrazzo and ceramic tile, the detergent compositions may also be applied to coated floors. For example, the detergent compositions may be applied on finish coated marble, granite, terrazzo, concrete, dry shake, ceramic tiles, wood, linoleum, vinyl, cork, bamboo and rubber substrates. Examples of finishes used for coating a floor substrate include acrylic based emulsions, polyurethanes, epoxy coatings and aziridine crosslinked floor finishes. Methods suitable for cleaning a surface using the detergent composition are also provided.

The detergent composition generally includes a cleaning agent, a gloss-enhancing agent, an anti-slip agent and water. Suitable component concentrations for the concentrated detergent composition range from between about 4% and about 50% by weight cleaning agent, between about 0.1% and about 20% by weight gloss-enhancing agent, between about 0.5% and about 10% by weight anti-slip agent, and between about 20% and about 95.4% water. Particularly suitable component concentrations for the detergent composition range from between about 5% and about 35% by weight cleaning agent, between about 0.1% and about 10% by weight gloss-enhancing agent, between about 1.0% and about 5% by weight anti-slip agent and between about 50% and about 93.9% water. More particularly suitable component concentrations for the detergent composition range from between about 6% and about 25% by weight cleaning agent, between about 0.15% and about 7.5% by weight gloss-enhancing agent, between about 1.5% and about 4% by weight anti-slip agent and between about 63.5% and about 92.4% water. Those skilled in the art will appreciate other suitable component concentration ranges for obtaining comparable properties of the detergent composition.

The cleaning agent can be composed of any components used to form a detergent. For example, the cleaning agent may be formed of amines, fatty acid, caustics, alkaline sources, salts, solvents or surfactants. In one embodiment, the cleaning agent is a fatty acid salt or a combination of a fatty acid and an alkalinity source. In particular, the cleaning agent may be formed of a fatty acid amine salt. For example, the cleaning agent may be a mixture of oleic acid and monoethanolamine (MEA). The term "fatty acid" includes any of a group of carboxylic acids that can be derived from or contained in an animal or vegetable fat or oil. Fatty acids are composed of a chain of alkyl groups and characterized by a terminal carboxyl group. The alkyl groups can be linear or branched. The fatty acid can be saturated or unsaturated. In some embodiments, the chain of alkyl groups contain from 4 to 24 carbon atoms, particularly from 6 to 24 carbon atoms, and more particularly from 12 to 18 carbon atoms. The detergent composition can include combinations or mixtures of different fatty acids. An example of a suitable fatty acid is oleic acid, but as set forth above, a broad variety of other fatty acids or combinations or mixtures thereof are contemplated for use.

The fatty acid component can include up to about 48% by weight of the detergent composition. For example, the detergent composition can include, in the range of 2% to about 48% by weight fatty acid component, in some embodiments in the range of about 2% to about 33% by weight fatty acid component, and in some embodiments in the range of about 2% to about 18% by weight fatty acid component. Some examples of dilute or use detergent compositions can include, in the range of 0.015 to about 10% by weight fatty acid component, in some embodiments in the range of about −0.015% to about 5% by weight fatty acid component, and in some embodiments in the range of about 0.015% to about 1% by weight fatty acid component.

Amines are organic derivatives of ammonia in which one or more of the ammonia hydrogens are replaced by alkyl or aromatic groups. A variety of organic amines may be employed in the compositions and methods of the present invention. Representative organic amines are alkyl amines, which may be primary, secondary, or tertiary, such as isopropylamine, ethylmethylamine and trimethylamine, or substituted organoamines (e.g., alkanolamines) such as monoethanolamine, diethanolamine and triethanolamine, 1,2-diaminoethane, 1,2-diaminopropane, N-benzylethanolamine, 2-aminomethylpropanol, furfurylamine, tetrahydrofurfurylamine and the like, and mixtures thereof, or cyclic amines such as morpholine, or ethoxylate amines such as ethoxylated tallow amine, ethoxylated coconut amine, ethoxylated alkyl propylene amines, and the like, and mixtures thereof. In particular, the amine may be an organoamine which may be accompanied by other amines or by salts of the amines.

When the detergent composition is formulated as a concentrate, the organic amine may represent, for example, between about 2% and about 48%, about 2% and about 33% or about 2% and about 18% of the total concentrate weight. The amount of amine in the detergent composition may also be expressed in terms of the molar equivalent ratio of acid to amine. For example, acid:amine molar equivalent ratios of between about 0.5:1 and about 2:1 may be employed. However, the amount of amine may be adjusted to obtain a desired pH in the final concentrate or use-solution.

When a fatty acid is used as the cleaning agent in the detergent composition, the detergent composition can include an effective amount of one or more caustic sources to enhance cleaning of a substrate and improve soil removal performance of the detergent composition. In general, it is expected that the composition may include the caustic source in an amount of at least about 0.1% by weight, at least about 5% by weight, or at least about 10% by weight.

Examples of suitable caustic sources of the detergent composition include, but are not limited to an alkali metal carbonate and an alkali metal hydroxide. Exemplary alkali metal carbonates that can be used include, but are not limited to: sodium or potassium carbonate, bicarbonate, sesquicarbonate, and mixtures thereof. Exemplary alkali metal hydroxides that can be used include, but are not limited to sodium, or potassium hydroxide. The alkali metal hydroxide may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 50% and a 73% by weight solution. It is preferred that the alkali metal hydroxide is added in the form of an aqueous solution, particularly a 50% by weight hydroxide solution, to reduce the amount of heat generated in the composition due to hydration of the solid alkali material.

In addition to the first caustic source, the detergent composition may comprise a secondary caustic source. Examples of useful secondary caustic sources include, but are not limited to: metal silicates such as sodium or potassium silicate or metasilicate; metal carbonates such as sodium or potassium carbonate, bicarbonate, sesquicarbonate; metal borates such as sodium or potassium borate; and ethanolamines and amines. Such caustic agents are commonly available in either aqueous or powdered form, either of which is useful in formulating the present solid detergent compositions.

The cleaning agent is present in an amount effective to provide detersive properties. An effective amount should be considered as an amount that provides a use composition having a pH of between about 7 and about 11, particularly between about 8 and 11, and more particularly between about 9.5 and about 10.5. Additional pH adjusting agents may be used to provide the use composition with the desired pH. Suitable pH adjusting agents for such alkaline-based compositions include organic and inorganic acids, such as acetic acid, hydrochloric acid, sulfuric acid and citric acid.

The gloss-enhancing agent is formed of water-soluble or water-dispersable film-forming polymeric materials. The film-forming material can be a single component or a formulated composition. The film-forming material can be in the form of a solid, paste, gel, solution, emulsion or suspension. Examples of suitable single component film-forming polymeric materials include, but are not limited to: water-soluble or water-dispersible acrylic polymers, such as polyacrylic acid and its copolymers; metal cross-linked acrylic polymers, such as water-soluble or water-dispersible acid-containing polymers crosslinkable using transition metals, alkaline earth metals, alkali metals or mixtures thereof (e.g., zinc crosslinked acrylics) polystyrene and its copolymers, such as maleic acid/styrene copolymers; polyurethanes; epoxy polymers; wax emulsions, such as polyethylene and, polypropylene waxes; alkali soluble acrylic resins; polyvinylpyrrolidone and its copolymers; polyvinyl alcohol and its copolymers; modified cellulose; sulfonated polystyrenes, polyamide and its copolymers; polyethylene vinyl acetate polymers (e.g., polyvinyl acetate-polyethylene copolymers); chloropolymers; fluoropolymers; polycarbonate polymers; cellulose polymers, ethylene copolymer emulsions and their mixtures and a variety of other materials that will be familiar to those skilled in the art. Examples of suitable commercially available gloss-enhancing single component agents include Duraplus 2 modified acrylic metal crosslinked polymer, Duraplus 3 zinc crosslinked acrylic dispersion, PRIMAL™ E-2409 polymer emulsion, PRIMAL™ NT-6035 APEO- and metal-free polymer emulsion, UHS™ PLUS Metal-crosslinked, modified acrylic polymer, all available from Rohm & Haas Co., Philadelphia, Pa.; Megatran 205 zinc crosslinked acrylic dispersion and Syntran 1580 zinc crosslinked acrylic dispersion, available from Interpolymer Corp. Canton, Mass.; Morglo 2 zinc crosslinked acrylic dispersion, Mor-Glo 2007 styrene-acrylic polymer emulsion and ML-870 zinc containing styrene-acrylic polymer emulsion available from Omnova Solutions, Inc. Fairlawn, Ohio.

As previously mentioned, the gloss enhancer may be a single polymer, a mixture of several polymers, a formulated polymer solution, or a formulated polymer emulsion, such as a high gloss floor finish without departing from the intended scope of the present invention. Examples of suitable formulated film-forming materials include acrylic finishes or a mixture of an acrylic polymer, alkali soluble resin and polyethylene wax emulsion. Examples of a suitable commercially available formulated film-forming material include, for example, MarketStar and Laser, available from Ecolab Inc., St. Paul, Minn.

Suitable concentrations for the gloss-enhancing agent range from between about 0.1% and about 20% by weight Particularly suitable concentrations for the gloss-enhancing agent range from between about 0.2% and about 15% by weight. More particularly suitable concentrations for the gloss-enhancing agent range from between about 0.3% and about 10% by weight.

In one embodiment, a surface treated with the detergent composition has an increase in 60° gloss of at least about 20% after the composition is applied to the surface. Particularly, the surface treated with the detergent composition has an increase in 60° gloss of at least about 30%, at least about 40%, at least about 50%, at least about 60%. In another embodiment, a surface treated with the detergent composition has an increase in 20° gloss of at least about 20% after the composition is applied to the surface. Particularly, the surface treated with the detergent composition has an increase in 20° gloss of at least about 40%, at least about 50%, at least about 60%. The gloss of the surfaces treated with the compositions are determined by measuring the light reflectance of the surfaces at about 20 degrees, at about 60 degrees or both using the Micro-TRI-Gloss meter, available from BYK-Gardner, Columbia, Md.

The anti-slip agent can be a single component or a multi-component system. Exemplary single component anti-slip agents include alkyl polyglycosides. In one embodiment, the anti-slip agent may be a polyglucoside. In particular, the polyglucoside may be composed of water and alkyl polyglucoside mixtures. A suitable component concentration for the anti-slip agent for the detergent composition ranges from between about 1% and about 5% by weight of the anti-slip agent. A more particular component concentrations for the anti-slip agent for the detergent composition ranges from between about 1% and about 4% by weight of the anti-slip agent. A more particular component concentrations for the anti-slip agent for the detergent composition ranges from between about 2% and about 3% by weight of the anti-slip agent. Those skilled in the art will appreciate other suitable component concentration ranges for obtaining comparable properties of the detergent composition. Examples of suitable commercially available anti-slip agents include, but are not limited to, StoneMedic Anti-slip Treatment available from Ecolab Inc., Saint, Paul, Minn. and Glucopon 425N available from Cognis Corporation, Cincinnati, Ohio.

Generally, a surface having a coefficient of friction of at least about 0.5 is considered to provide anti-slip properties and to be safe.

Additional Functional Materials

The detergent composition can include additional components or agents, such as additional functional materials. As such, in some embodiments, the detergent composition including the cleaning agent, gloss-enhancing agent and anti-slip agent may provide a large amount, or even all of the total weight of the detergent composition. For example, in embodiments having few or no additional functional materials disposed therein. The functional materials provide desired properties and functionalities to the detergent composition. For the purpose of this application, the term "functional materials" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and a broad variety of other functional materials may be used. For example, many of the functional materials discussed below relate to materials used in cleaning applications. However, other embodiments may include functional materials for use in other applications.

Solvents

Exemplary organic solvents that can be used include hydrocarbon or halogenated hydrocarbon moieties of the alkyl or cycloalkyl type, and have a boiling point well above room temperature, i.e., above about 20° C.

Considerations for selecting organic solvents include beneficial properties and aesthetic considerations. For example, in some applications where malodors would not be tolerated, the formulator would be more likely to select solvents which have a relatively pleasant odor, or odors which can be reasonably modified by perfuming.

The C6-C9 alkyl aromatic solvents, especially the C6-C9 alkyl benzenes, preferably octyl benzene, exhibit excellent grease removal properties and have a low, pleasant odor. Likewise the olefin solvents having a boiling point of at least about 100° C., especially alpha-olefins, preferably 1-decene or 1-dodecene, are excellent grease removal solvents.

Generically, the glycol ethers can be used. Exemplary glycol ethers include monopropyleneglycolmonopropyl ether, dipropyleneglycolmonobutyl ether, monopropyleneglycolmonobutyl ether, ethyleneglycolmonohexyl ether, ethyleneglycolmonobutyl ether, diethyleneglycolmonohexyl ether, monoethyleneglycolmonopropyl ether-, diethyleneglycolmonobutyl ether, and mixtures thereof.

Solvents such as pine oil, orange terpene, benzyl alcohol, n-hexanol, phthalic acid esters of C1-4 alcohols, butoxy propanol, Butyl Carbitol® and 1(2-n-butoxy-1-methylethoxy) propane-2-ol (also called butoxy propoxy propanol or dipropylene glycol monobutyl ether), hexyl diglycol (Hexyl Carbitol®), butyl triglycol, isopropyl alcohol, diols such as 2,2,4-trimethyl-1,3-pentanediol, and mixtures thereof, can also be used.

The concentrate can include the organic solvent component in an amount to provide the desired cleaning, product stability and evaporative properties. In general, the amount of solvent should be limited so that the use solution is in compliance with volatile organic compound (VOC) regulations for a particular class of cleaner. In addition, it should be understood that the organic solvent is an optional component and need not be incorporated into the concentrate or the use solution according to the invention. When the organic solvent is included in the concentrate, it can be provided in an amount of between about 0.1 wt. % and about 75 wt. %, between about 5 wt. % and about 50 wt. %, and between about 10 wt. % and about 30 wt. %.

Surfactants

The detergent composition can include a surfactant or surfactant mixture. A variety of surfactants can be used in a detergent composition, including, but not limited to: anionic, nonionic, cationic, and amphoteric (including zwitterionic) surfactants. Surfactants are an optional component of the detergent composition and can be excluded from the concentrate. Exemplary surfactants that can be used are commercially available from a number of sources. For a discussion of surfactants, see Kirk-Othmer, Encyclopedia of Chemical Technology, Third Edition, volume 8, pages 900-912. When the detergent composition includes a surfactant or a mixture of surfactants, the surfactant is provided in an amount effective to provide a desired level of functionality, such as wetting, stability, foam profile and cleaning. The detergent composition, when provided as a concentrate, can include the surfactant in a range of about 0.05% to about 50% by weight, about 0.5% to about 40% by weight, about 1% to about 30% by weight, about 1.5% to about 20% by weight, and about 2% to about 10% by weight. Additional exemplary ranges of surfactant in a concentrate include about 0.5% to about 10% by weight, and about 1% to about 8% by weight.

Examples of anionic surfactants useful in the detergent composition include, but are not limited to: carboxylates such as alkylcarboxylates and polyalkoxycarboxylates, alcohol ethoxylate carboxylates, nonylphenol ethoxylate carboxylates; sulfonates such as alkylsulfonates, alkylbenzenesulfonates, alkylarylsulfonates, alpha-olefinsulfonate, sulfonated fatty acid esters; sulfates such as sulfated alcohols including fatty alcohol sulfates, sulfated alcohol ethoxylates, sulfated alkylphenols, alkylsulfates, sulfosuccinates, and alkylether sulfates.

Examples of nonionic surfactants useful in the detergent composition include, but are not limited to, those having a polyalkylene oxide polymer as a portion of the surfactant molecule. Such nonionic surfactants include, but are not limited to: chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated amines such as alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ether; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers. An example of a commercially available ethylene oxide/propylene oxide block copolymer includes, but is not limited to, PLURONIC®, available from BASF Corporation, Florham Park, N.J. An example of a commercially available silicone surfactant includes, but is not limited to, ABIL® B8852, available from Goldschmidt Chemical Corporation, Hopewell, Va.

Examples of cationic surfactants that can be used in the detergent composition include, but are not limited to: amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride. The cationic surfactant can be used to provide sanitizing properties.

Examples of amphoteric surfactants that can be used in the detergent composition include, but are not limited to: betaines such as dodecyl dimethyl sulfobetaine, imidazolines, and propionates.

Some surfactants can also function as secondary solidifying agents if a solid detergent composition is desired. For example, anionic surfactants which have high melting points provide a solid at the temperature of application. Anionic surfactants which have been found most useful include, but are not limited to: linear alkyl benzene sulfonate surfactants, alcohol sulfates, alcohol ether sulfates, and alpha olefin sulfonates. Generally, linear alkyl benzene sulfonates are preferred for reasons of cost and efficiency. Amphoteric or zwitterionic surfactants are also useful in providing detergency, emulsification, wetting and conditioning properties. Representative amphoteric surfactants include, but are not limited to: N-coco-3-aminopropionic acid and acid salts, N-tallow-3-iminodiproprionate salts, N-lauryl-3-iminodiproprionate disodium salt, N-carboxymethyl-N-cocoalkyl-N-dimethylammonium hydroxide, N-carboxymethyl-N-dimethyl-N-(9-octadecenyl)ammonium hydroxide, (1-carboxyheptadecyl) trimethylammonium hydroxide, (1-carboxyundecyl) trimethylammonium hydroxide, N-cocoamidoethyl-N-hydroxyethylglycine sodium salt, N-hydroxyethyl-N-stearamidoglycine sodium salt, N-hydroxyethyl-N-lauramido-.beta.-alanine sodium salt, N-cocoamido-N-hydroxyethyl-.beta.-alanine sodium salt, mixed alcyclic amines and their ethoxylated and sulfated sodium salts, 2-alkyl-1-carboxymethyl-1-hydroxyethyl-2-imidazolinium hydroxide sodium salt or free acid wherein the alkyl group may be nonyl, undecyl, and heptadecyl. Other useful amphoteric surfactants include, but are not limited to: 1,1-bis(carboxymethyl)-2-undecyl-2-imidazolinium hydroxide disodium salt and oleic acid-ethylenediamine condensate, propoxylated and sulfated sodium salt, and amine oxide amphoteric surfactants.

Polymers

Optionally polymer additives can be used in the detergent composition to provide desirable benefits. Examples of the benefits include that some polymers can function as solidifying agents if a solid detergent composition is desired. Some polymers can function as a solution rheology modifier, some polymers can function as a chelating agent, some polymers can function as a stabilizer and some polymers can provide multi-benefits to the detergent composition.

Exemplary polymer rheology modifiers include Acusol 810A and Acusol 842, both are alkali soluble acrylic polymer emulsions available from Rohm and Haas Company. These materials also function as stabilizers. Other examples of polymeric stabilizers include ACUSOL 820, a hydrophobically modified alkali soluble acrylic polymer emulsion (HASE) and polyols such as ACUSOL™ 880, a hydrophobically modified, nonionic polyol. Both are available from Rohm and Haas Company. Exemplary polymeric chelating agent include acrylic polymers and their copolymers, such as ACU-SOL™ 497N, a copolymer of acrylic acid and maleic anhydride available from Rohm and Haas Company.

Fragrances

Various odorants including perfumes, and other aesthetic enhancing agents can also be included in the composition. Fragrances or perfumes that may be included in the compositions include, but are not limited to: terpenoids such as citronellol, aldehydes such as amyl cinnamaldehyde, a jasmine such as C1S-jasmine or jasmal, and vanillin.

Other Functional Materials

In addition to the functional materials mentioned above, other optional additional functional materials that can be included in the detergent composition of the present invention include chelating agents such as ethylene diamine tetraacetic acid (EDTA) and its sodium salts; pH adjusters such as amines, acids and pH buffers; foam modifiers such as silicone defoamers; coloring agents, such as dyes; and pearlising agents.

Methods of Use

In an embodiment, the present invention includes methods employing the detergent composition including the gloss-enhancing agent and the anti-slip agent. The method can result in increased gloss and anti-slip properties of a surface. In general, a detergent composition having improved gloss-enhancing and anti-slip properties can be created by combining a cleaning agent, a gloss-enhancing agent and an anti-slip agent and any additional functional components and mixing the components to form a homogeneous mixture. For example, in a first embodiment, the detergent composition may include a cleaning agent, a gloss-enhancing agent, an anti-slip agent, a caustic source, amines, solvents, a pearlising agent, surfactants, polymers, fatty acids, plasticizers and a fragrance. In an exemplary embodiment, the detergent composition includes a cleaning agent constituting between about 4% and about 50% by weight of the composition, a gloss-enhancing agent constituting between about 0.1% and 20% by weight of the composition, an anti-slip agent constituting between about 0.5% and about 10% by weight of the composition, and water constituting between about 20% and about 95.4% by weight of the composition. In particular, the detergent composition includes a cleaning agent including between about 5% and about 35% by weight of the composition, a gloss-enhancing agent constituting between about 0.1% and about 10% by weight of the composition, an anti-slip agent constituting between about 1% and about 5% by weight of the composition, and between about 50% and about 93.9% by weight of the composition. More particularly, the detergent composition includes a cleaning agent including between about 6% and about 25% by weight of the composition, a gloss-enhancing agent constituting between about 0.15% and about 7.5% by weight of the composition, an anti-slip agent constituting between about 1.5% and about 4% by weight of the composition, and between about 63.5% and about 92.4% by weight of the composition.

Prior to applying the detergent composition, the concentrate can be diluted with water to form a use solution. For example, the dilution ratio of concentrate to water can be about 1:128. The use solution can be applied on various coated or non coated substrates including stone surface such as marble, concrete, granite, terrazzo and ceramic tiles and other surfaces, such as wood, linoleum and vinyl composition tile. The detergent composition is applied to a surface on a daily or a weekly basis. In one embodiment, the composition is applied onto a surface at least about 3 days a week. In an alternative embodiment, the composition is applied onto a surface once a day. The present methods include applying the detergent composition by any means known in the art. For example, the composition may be applied using a scrubber, a mop, a roller or a spray. Examples of suitable scrubbers include manual and auto floor scrubbers. Examples of suitable mops include string and flat mops.

In all circumstances, a surface coated with the composition dries within about 1 hour of when the composition is applied to the surface. However, the amount of time it takes a surface coated with the composition to dry depends on the method used to apply the composition. A surface coated with the composition may dry within about 30 minutes, about 15 minutes, about 5 minutes and about 1 minute of when the composition is applied to the surface. For example, if the composition is applied with a mop and bucket, the surface will dry within about 5 to 15 minutes. If the composition is applied with an autoscrubber, the surface will dry almost immediately.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Materials Used

StoneMedic DCC: a cleaner/conditioner available from Ecolab, Inc., St. Paul, Minn.

MarketStar: a floor finish available from Ecolab, Inc., St. Paul, Minn.

StoneMedic Anti-Slip Treatment: an anti-slip agent available from Ecolab, Inc., St. Paul, Minn.

Belclene 283: a maleic acid copolymer as scale/deposit control agent available from FMC Corporation, Philadelphia, Pa.

Hostapur SAS, 30%: a secondary alkane sulfonate sodium salt available from Clariant Corporation, The Woodlands, Tex.

Morglo 8: a styrene acrylic zinc cross-linked polymer emulsion (38% solids) available from Omnova Solutions, Inc. Fairlawn, Ohio.

Glucopon 425-N: an alkyl polyglucoside available from Cognis, Cincinnati, Ohio.

Surface Preparation and Treatment

A plurality of uncoated Terrazzo tiles were used to measure the gloss and the coefficients of friction of surfaces treated with detergent compositions of the present invention. The tiles that were used to measure gloss were prepared by sanding the tiles using a hand sander with 50 grit paper until the gloss of the tiles were less than about 6 when measured at 20 degrees and less than about 8 when measured at about 60 degrees.

The tiles that were used to measure coefficient of friction were cleaned three times with the use solution by pouring about 20 ml of solution onto about 4 square inches of the tile and spreading the use solution with a microfiber pad and squeegeeing the remainder. The tiles were allowed to dry for about 10 minutes. After the tiles were dry, the gloss and the coefficients of frictions were measured and noted.

The compositions described in the examples below were diluted at a ratio of about 1:128 composition to water to form a use solution.

Examples 1 and 2 and Comparative Example A

Examples 1 and 2 are compositions of the present invention for enhancing gloss of a surface. In particular, the compositions of Examples 1 and 2 include a mixture of StoneMedic DCC, a cleaner, and MarketStar, a floor finish. The components were added together and mixed to form a homogeneous mixture.

Comparative Example A was used as the control and included only the StoneMedic DCC.

Table 1 provides the component concentrations and the pHs for the compositions of Examples 1 and 2.

TABLE 1

| Component | Example 1 (wt %) | Example 2 (wt %) |
|---|---|---|
| StoneMedic DCC | 98 | 97 |
| MarketStar | 2 | 3 |
| pH | 9.77 | 9.77 |

The gloss of the compositions of Examples 1 and 2 were measured at about 20 degrees and about 60 degrees. The light reflectance of the surfaces totaling about one square foot were measured 5 times and averaged. To measure the gloss of the surfaces treated with the compositions, the light reflectance of the surfaces were measured at about 20 degrees and about 60 degrees after each of sequential four steps: (1) treating with a TWISTER® White pad, (2) treating with a TWISTER® Yellow pad, (3) treating with a TWISTER® Green pad and (4) dry treating with a TWISTER® Green pad. There was no cleaner on the tile during the dry treating step, which was a dry step. Each treatment included 15 passes over the surface at a pressure of about 6 pounds and a speed of about 625 revolutions per minute, with the total cycle lasting about 72 seconds. For treatment steps 1-3 in which a cleaner was present, about 3-6 mls of cleaner was applied per 6 inches of tile. The equipment used to clean/polish the surface with the pads was the Precision Force Applicator, available from Precision Analytical Instruments Inc. The pads are available from TWISTER®, manufactured by HTC, Inc., Knoxville, Tenn. The light reflectance of the surfaces were measured using the Micro-TRI-Gloss meter, available from BYK-Gardner, Columbia, Md.

Table 2 provides the gloss build measured at 20 degrees and at 60 degrees for the compositions of Examples 1 and 2. Generally, the higher the 20 degree and 60 degree gloss build up on a surface, the glossier the appearance of the surface.

TABLE 2

| | Initial | First Treatment | Second Treatment | Third Treatment | Fourth Treatment |
|---|---|---|---|---|---|
| | | | 20 degrees | | |
| Example 1 | 0.9 | 2.1 | 3.7 | 11.4 | 22.6 |
| Example 2 | 5.4 | 3.9 | 8.4 | 12.5 | 24.4 |
| | | | 60 degrees | | |
| Example 1 | 3 | 14.1 | 19.4 | 43.9 | 67.6 |
| Example 2 | 19.4 | 21.9 | 32.1 | 38.2 | 55.4 |

As illustrated in Table 2, the 20 degree and 60 degree gloss of the surfaces treated with the compositions of Examples 1 and 2 increased as the surfaces were successively cleaned. In particular, the final surface treated with the composition of Example 1 had an increase of about 2411% in 20 degree gloss and an increase of about 2153% in 60 degree gloss. The final surface treated with the composition of Example 2 had an increase of about 352% in 20 degree gloss and an increase of about 186% in 60 degree gloss.

The coefficient of friction of the surfaces treated with the compositions of Examples 1 and 2 and Comparative Example A were then measured using the Universal Walkway Tester BOT 3000 to determine whether the gloss enhancing agent had an effect on the coefficient of friction of a surface coated with the composition. Three coefficients of friction (CoF) were measured: dry static coefficient of friction (Dry SCoF), static wet coefficient of friction (Wet SCoF) and wet dynamic coefficient of friction (Wet DCoF). Static CoF (SCoF) is the force required to initiate sliding of a static object on a surface divided by the force which maintains contact between the object and the surface. Dynamic COF (DCoF) is the force required to arrest the motion of a moving object on a surface divided by the force which maintains contact between the object and the surface. A low CoF indicates high slipperiness. For most material combinations, the value of the static coefficient of friction exceeds that of the value of the dynamic coefficient of friction.

To measure the dry SCoF, a leather sensor was used with the BOT 3000, Binary Output Tribometer provided by Universal Walkway Testings. The sensor was sanded with a 320 grit pad and dusted. The sensor was then placed in the BOT 3000 and the dry static coefficient of friction was taken on the cleaner treated surface. A total of three individual measurements were taken and averaged for a final value.

To measure the wet SCoF, a neolite sensor was used with the BOT 3000. The sensor was sanded with a 100 grit pad and dusted. The sensor was then equilibrated in about 0.5 inches of deionized water for about five minutes before being placed in the sensor port. A two by twenty inch trail of deionized water was applied on the surface of the cleaner treated sample. The BOT 3000 was then placed on the surface in the manner so that the sensor aligned with the trail of deionized water and the wet static coefficient of friction was taken. A total of three individual measurements were taken and averaged for a final value.

To measure the wet DCoF, a neolite sensor was used with the BOT 3000. The sensor was sanded with a metal file about 0.5 inches thick and dusted. The sensor was then equilibrated in about 0.5 inches of deionized water for about five minutes before being placed in the sensor port. A two by twenty inch trail of deionized water was applied on the surface. The BOT 3000 was then placed on the surface in the manner so that the sensor aligned with the trail of the deionized water and the wet dynamic coefficient of friction was taken. A total of three individual measurements were taken and averaged for a final value.

Table 3 provides the coefficients of friction (CoF) of the compositions of Examples 1 and 2 and Comparative Example A.

TABLE 3

| | Avg. Dry SCoF | Avg. Wet SCoF | Avg. Wet DCoF |
|---|---|---|---|
| Example 1 | 0.38 | 0.87 | 0.28 |
| Example 2 | 0.35 | 0.91 | 0.32 |
| Comp. Example A | 0.34 | 0.73 | 0.48 |

As can be seen in Table 3, and taking into the standard deviation, the surfaces treated with the compositions of Examples 1 and 2 exhibited substantially similar or slightly higher dry and wet static coefficients of friction than the surface treated with the composition of Comparative Example A. Thus, the gloss-enhancement agent likely had little or no affect on the coefficient of friction of the surfaces coated with the compositions of Examples 1 and 2.

Examples 3 and 4

Examples 3 and 4 are compositions of the present invention for increasing the slip resistance of a surface. The compositions of Examples 3 and 4 are similar to the compositions of Examples 1 and 2, except that the compositions of Examples 3 and 4 included an anti-slip agent, rather than the gloss enhancement agent. In particular, the compositions of Examples 3 and 4 included StoneMedic DCC, a cleaner, and StoneMedic Anti-Slip Treatment, an anti-slip agent. The components were mixed together to form a homogeneous mixture.

The composition of StoneMedic DCC was used as Comparative Example A.

Table 4 provides the component concentrations for the compositions of Examples 3 and 4 and Comparative Example A.

TABLE 4

| Component | Example 3 (wt %) | Example 4 (wt %) | Comp. Ex. A (wt %) |
|---|---|---|---|
| StoneMedic DCC | 98 | 97 | 100 |
| StoneMedic Anti-Slip Treatment | 2 | 3 | 0 |

The compositions of Examples 3 and 4 and Comparative Example A were then tested for the dry static coefficient of friction and wet static coefficient of friction using the methods described above for the compositions of Examples 1 and 2 and Comparative Example A. The surfaces were treated with the compositions of Examples 3 and 4 and Comparative Example A a first time, a second time and a third time. After each treatment, the coefficients of friction were measured and recorded. Table 5 provides the coefficients of friction of the compositions of Examples 3 and 4, Comparative Example A, and untreated surface after each treatment. Generally, a surface having a coefficient of friction of at least about 0.5 is considered to provide anti-slip properties and to be safe.

TABLE 5

| | First Treatment | Second Treatment | Third Treatment |
|---|---|---|---|
| | Dry Static Coefficient of Friction | | |
| Example 3 | 0.48 | 0.44 | 0.50 |
| Example 4 | 0.50 | 0.56 | 0.58 |
| Comp. Example A | 0.50 | 0.42 | 0.44 |
| | Wet Static Coefficient of Friction | | |
| Example 3 | 0.89 | 0.87 | 0.86 |
| Example 4 | 0.87 | 0.88 | 0.87 |
| Comp. Example A | 0.87 | 0.90 | 0.85 |

As can be seen in Table 5, the surfaces treated with the compositions of Examples 3 and 4 exhibited higher dry static coefficients of friction than the surface treated with the composition of Comparable Example A. While the dry static CoF of the surfaces treated with the compositions of Examples 3 and 4 and the composition of Comparative Example A were substantially the same after the first treatment, the dry static CoF of the surface treated with the composition of Example 4 was about 33% higher than the dry static CoF of the surface treated with the composition of Comparative Example A after the second treatment. After the third treatment, the dry static CoFs of the surfaces treated with the compositions of Examples 3 and 4 were about 13.6% and about 31.8% higher, respectively, than the surface treated with the composition of Comparative Example A.

Examples 5, 6, 7, 8 and 9

Examples 5, 6, 7, 8 and 9 are compositions for evaluating gloss enhancement. The compositions of Examples 5-9 included component concentrations (in weight percent) of water, oleic acid, monoethanolamine (MEA), Hostapur SAS, Beclene 283 and Morglo 8 as provided in Table 6. The components were added together and mixed to form a homogeneous mixture.

As the composition of Example 1 was shown to perform effectively as a gloss enhancer, the composition of Example 1 was used as the control. The composition of Example 1 included 98% by weight StoneMedic DDC and 2% by weight MarketStar and had a pH of 9.77.

Table 6 provides the component concentrations of the compositions of Examples 1, 5, 6, 7, 8 and 9 as well as the pH of each of the compositions.

TABLE 6

| Component | Example 5 (wt %) | Example 6 (wt %) | Example 7 (wt %) | Example 8 (wt %) | Example 9 (wt %) |
|---|---|---|---|---|---|
| Water | 67.87 | 67.28 | 66.92 | 67.83 | 67.05 |
| Oleic Acid | 9 | 9 | 9 | 9 | 9 |
| MEA | 3 | 3 | 3 | 3 | 3 |
| Hostapur SAS, 30% | 20 | 20 | 20 | 20 | 20 |
| Belclene 283 | 0.13 | 0.72 | 0.13 | 0 | 0 |
| Morglo 8 | 0 | 0 | 0.95 | 0.17 | 0.95 |
| pH | 10.1 | 9.97 | 10.14 | 10.17 | 10.18 |

The gloss of the compositions of Examples 5-9 and Example 1 were measured at about 20 degrees and 60 degrees initially and after each of three cleaning treatments with a Gardner Abrasion Tester and an HTC Twister Polishing floor pad available from TWISTER®, manufactured by HTC, Inc., Knoxville, Tenn. The light reflectance of the surfaces were measured using the Micro-TRI-Gloss meter, available from BYK-Gardner, Columbia, Md. The three cleaning treatments included: (1) treating with a TWISTER® White pad, (2) treating with a TWISTER® Yellow pad and (3) treating with a TWISTER® Green pad.

The floor cleaning simulation used the Gardner Abrasion Tester. About 1 pound of weights was added to the Gardner original carrier to mimic the pressure added by the user or machine when the floor is being cleaned. Each of the pads was cut to about 0.38" by 0.3" to fit inside the Gardner straight-line tester's carrier. The pads were rinsed in tap water 3 times and shaken dry. To simulate an autoscrubber application, the pads were saturated with about 25 ml of solution and 20 cycles were run. The tiles were removed from the template, gently rinsed with water and set to dry. Table 7 provides the gloss build measured at 20 degrees and 60 degrees for the compositions of Examples 5-9 and Example 1.

TABLE 7

|  | Initial | First Treatment | Second Treatment | Third Treatment |
|---|---|---|---|---|
| 20 Degrees | | | | |
| Example 5 | 0.4 | 0.4 | 0.8 | 0.9 |
| Example 6 | 0.4 | 0.9 | 0.8 | 1.5 |
| Example 7 | 0.5 | 1.5 | 2.6 | 1.9 |
| Example 8 | 0.4 | 0.8 | 3 | 3.7 |
| Example 9 | 0.3 | 0.9 | 5.5 | 6.7 |
| Example 1 | 0.6 | 0.9 | 1 | 1.2 |
| 60 Degrees | | | | |
| Example 5 | 4.2 | 4.4 | 6.8 | 9 |
| Example 6 | 3.3 | 8.2 | 8.8 | 13.8 |
| Example 7 | 5 | 12.7 | 16.2 | 12.8 |
| Example 8 | 4.6 | 7.1 | 18.3 | 20 |
| Example 9 | 4.4 | 9 | 17.6 | 25.1 |
| Example 1 | 4.8 | 8.3 | 10.6 | 12.5 |

As illustrated in Table 7, the 20 degree gloss and 60 degree gloss of the surfaces treated with the compositions of Examples 5-9 increased with almost each treatment. The surface treated with the composition of Example 5 had a 20 degree gloss substantially similar to the surface treated with the composition of the control (Example 1) after about 2 treatments while the surfaces treated with the compositions of Examples 6-9 had a 20 degree gloss either substantially similar to, or greater than, the surface treated with the composition of Example 1. When measuring 60 degree gloss, the surfaces treated with the compositions of Example 6-9 had comparable results to the surface treated with the control after about one treatment.

After all of the treatments were completed, the surface treated with the composition of Example 5 had a 125% increase in 20 degree gloss and a 114% increase in 60 degree gloss, the surface treated with the composition of Example 6 had a 275% increase in 20 degree gloss and a 318% increase in 60 degree gloss, the surface treated with the composition of Example 7 had a 280% increase in 20 degree gloss and a 156% increase in 60 degree gloss, the surface treated with the composition of Example 8 had an 825% increase in 20 degree gloss and a 335% increase in 60 degree gloss and the surface treated with the composition of Example 9 had a 2133% increase in 20 degree gloss and a 470% increase in 60 degree gloss.

By contrast, the surface treated with the control composition of Example 1 showed a 100% increase in 20 degree gloss and a 160% increase in 60 degree gloss.

Examples 10, 11, 12, 13, 14 and 15

Coefficient of Friction Test

Examples 10, 11, 12, 13, 14 and 15 are compositions of the present invention for increasing the gloss enhancement and the slip resistance of a detergent composition. Once the gloss enhancement of the compositions of Examples 5-9 were measured, varying amounts of an anti-slip agent was added to the compositions of Examples 8 and 9, which exhibited the highest gloss enhancement properties, to form the compositions of Examples 10-15. The compositions of Examples 10-15 included component concentrations (in weight percent) of water, oleic acid, monoethanolamine (MEA), Hostapur SAS, Beclene 283, Morglo 8 and anti-slip agent, as provided in Table 8. The anti-slip agent used was Glucopon 425-N. The components were added together and mixed to form a homogeneous mixture.

The composition of Comparative Example 1 was used as the control and included only the StoneMedic DCC. The composition of Comparative Example 1 did not contain an anti-slip agent.

Table 8 provides the component concentrations for the compositions of Examples and 10-15, the pH of each of the compositions.

TABLE 8

| Component | Example 10 (wt %) | Example 11 (wt %) | Example 12 (wt %) | Example 13 (wt %) | Example 14 (wt %) | Example 15 (wt %) |
|---|---|---|---|---|---|---|
| Water | 64.92 | 65.83 | 65.05 | 63.92 | 64.83 | 64.05 |
| Oleic Acid | 9 | 9 | 9 | 9 | 9 | 9 |
| MEA | 3 | 3 | 3 | 3 | 3 | 3 |
| Hostapur SAS, 30% | 20 | 20 | 20 | 20 | 20 | 20 |
| Belclene 283 | 0.13 | 0 | 0 | 0.13 | 0 | 0 |
| Morglo 8 | 0.95 | 0.17 | 0.95 | 0.95 | 0.17 | 0.95 |
| Glucopon 425-N | 2 | 2 | 2 | 3 | 3 | 3 |
| pH | 10.12 | 10.14 | 10.16 | 10.07 | 10.17 | 10.18 |

The static coefficient of friction of each of the surfaces treated with the compositions of Examples 10-15 and Comparative Example 1 were measured and noted below in Table 9. The static coefficient of friction of each of the tiles was measured using ASTM F 489-96 *Standard Test Method for using a James Machine*.

TABLE 9

|  | Coefficient of Friction |
|---|---|
| Example 10 | 0.69 |
| Example 11 | 0.75 |
| Example 12 | 0.72 |
| Example 13 | 0.68 |
| Example 14 | 0.71 |
| Example 15 | 0.69 |
| Comparative Example 1 | 0.53 |

As illustrated in Table 9, the surfaces treated with the compositions of Examples 10-15 had higher coefficients of friction than the surface treated with the composition of Comparative Example 1. In particular, while the surface treated with the control composition of Comparative Example 1 had a CoF of about 0.53, the surfaces treated with the compositions of Examples 10-15 had CoFs of between about 0.68 and about 0.75, a difference of between about 28% and 41%, respectively.

Examples 11, 12, 14 and 15

Toner (Soil Attraction) Test

The compositions of Examples 11, 12, 14 and 15 were then tested to determine the tackiness level of a surface coated with each of the compositions and the ability of surfaces coated with each of the compositions to attract soil. The compositions of Examples 11, 12, 14 and 15 were diluted with water at a ratio of about 1:128.

The composition of StoneMedic DCC, a cleaner available from Ecolab Inc., St. Paul, Minn., was used as Comparative Example A. The composition of StoneMedic Anti-slip Treatment (AST), an anti-slip agent available from Ecolab Inc., St. Paul, Minn., was used as Comparative Example B.

To test the tackiness of surfaces coated with the compositions, 2 black foam rings were adhered to sample tiles. The StoneMedic DCC and StoneMedic AST were diluted to their recommended dilution rates. In particular, the StoneMedic DCC was diluted at a ratio of about 1:128 StoneMedic DCC to water and the StoneMedic AST was diluted at a ratio of about 1:48 to water. A 0.5 gram sample of the solutions were added onto the foam ring and allowed to contact the tiles overnight. The tackiness of the treated surface was then evaluated with a toner method by applying a uniform black toner layer with a sponge paint brush to the tested area. Excess toner was wiped away with a yellow microfiber cloth. A surface having a higher tackiness level will cause a greater amount of black toner to adhere to the surface. The more black toner that adhered on the surface, the more black the surface.

A BYK-Gardner SpectroGuide was used to measure the color change by measuring the L-value of the tested area. The L-value is the lightness of the color value from black to white. A lower L-value represents a more black appearance. An average of 5 measurements was recorded.

Table 10 illustrates the L-value, which reflects the tackiness levels of Examples 11, 12, 14 and 15 and Comparative Examples A and B. Generally, a lower L-value indicates that more soil attached to the surface due to the higher tackiness of the surface.

TABLE 10

| Composition | L-Value |
| --- | --- |
| Example 11 | 70.22 |
| Example 12 | 71.79 |
| Example 14 | 68.16 |
| Example 15 | 73.53 |
| Comparative Example A | 67.54 |
| Comparative Example B | 53.84 |

As can be seen in Table 10, the surfaces coated with the compositions of Examples 11, 12, 14 and 15 had a higher L-value than both of the surfaces coated with the compositions of Comparative Example A and Comparative Example B, indicating that the compositions of Examples 11, 12, 14 and 15 have lower tackiness levels than the compositions of Comparative Example A and Comparative Example B. Thus, surfaces coated with the compositions of Examples 11, 12, 14 and 15 attract soils to a lesser extent than surfaces coated with the compositions of Comparative Example A, a known cleaner, and the composition of Comparative Example B, a known anti-slip agent.

Examples 10, 11, 12, 13, 14 and 15

Cotton (Tack-Free) Test

The compositions of Examples 10, 11, 12, 13, 14 and 15 were then tested to determine the tack-free time for a surface coated with each of the compositions. The compositions were diluted to about a 1:128 ratio of composition to water.

The composition of StoneMedic DCC, a cleaner available from Ecolab Inc., St. Paul, Minn., was used as Comparative Example A. The StoneMedic DCC composition was diluted to about a 1:128 ratio of composition to water. The composition of StoneMedic Anti-slip Treatment, an anti-slip agent available from Ecolab Inc., St. Paul, Minn., was used as Comparative Example B. The StoneMedic Anti-slip Treatment was diluted to about a 1:48 ratio of composition to water.

To test the tack-free time of surfaces coated with the compositions, each of the compositions were applied to a Laneta chart using a #10 drawdown bar. A timer was started immediately after the composition was applied to the surface. The coated surface was closely monitored until it appears relatively dry to the touch. A half inch by half inch square of cotton was then cut and placed on the coated surface. A 2 kg weight was placed on top of the cotton and allowed to remain there for between about 15 to 30 seconds. The weight was then removed and the cotton was lightly brushed with a finger. If the cotton remained adhered to the coated surface, it was considered not to be tack-free and the test was repeated until the cotton no longer adhered to the coated surface. When the cotton no longer adhered to the coated surface, the time was recorded as the tack-free time of the composition. Table 11 illustrates the tack-free times of Examples 10, 11, 12, 13, 14 and 15 and Comparative Examples A and B.

TABLE 11

| Composition | Tack-free Time |
| --- | --- |
| Example 10 | 13:13 |
| Example 11 | 13:00 |
| Example 12 | 11:00 |
| Example 13 | 10:00 |
| Example 14 | 11:00 |
| Example 15 | 11:20 |
| Comparative Example A | 10:00 |
| Comparative Example B | 12:00 |

As can be seen in Table 11, surfaces coated with the compositions of Examples 12, 13, 14 and 15 had comparable tack-free times as surfaces coated with the compositions of Comparative Example A and Comparative Example B. The surface coated with the composition of Example 13 had a drying time equal to the drying time as the surface coated with the composition of Comparative Example A. While the surfaces coated with the compositions of Example 12, 14 and 15 took a little bit longer to dry than the surface coated with the composition of Comparative Example A, they dried in a shorter amount of time than the surface coated with the composition of Comparative Example B.

However, the surfaces coated with the compositions of Example 10 and 11 required more time to dry than the surfaces coated with the compositions of Comparative Examples A and B.

This data suggests that while surfaces coated with the compositions of Examples 12, 13, 14 and 15 have comparable dry times to surfaces coated with the compositions of Comparative Examples A and B, while surfaces coated with the compositions of Examples 10 and 11 have a longer dry time. Thus, surfaces coated with the compositions of Examples 12, 13, 14 and 15 can be exposed to traffic after substantially the same time as surfaces coated with the compositions of Comparative Examples A and B.

The present composition may be applied in any situation where it is desired to increase the glossiness and anti-slip properties of a surface. The present composition is safe to use on a daily or weekly basis and can be exposed to foot traffic about 15 minutes after the composition is applied onto a surface. The present composition may be employed in a commercial detergent composition to protect coated and uncoated surfaces, such as marble, granite, terrazzo, concrete, dry shake, ceramic tiles, wood, linoleum, vinyl, cork, bamboo and rubber.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

The following is claimed:

1. A method of cleaning an uncoated surface comprising:
   (a) providing a composition having a pH of between about 7 and about 11, the composition comprising:
     (i) a fatty acid amine salt constituting between about 5% and about 40% by weight of the composition;
     (ii) a gloss-enhancing agent constituting between about 0.1% and 20% by weight of the composition;
     (iii) an anti-slip agent constituting between about 0.5% and about 10% by weight of the composition; and
     (iv) water constituting between about 20% and about 94.6% by weight of the composition; and
   (b) applying the composition to the uncoated surface.

2. The method of claim 1, wherein the uncoated surface is a stone surface and wherein the stone surface is one of marble, concrete and terrazzo.

3. The method of claim 1, wherein the gloss-enhancing agent comprises acrylic polymers, waxes, alkali soluble resins, or a mixture thereof.

4. The method of claim 3, wherein the acrylic polymers comprise metal cross-linked acrylic polymers, styrene acrylic polymers, or metal cross-linked styrene acrylic polymers.

5. The method of claim 1, wherein the gloss-enhancing agent comprises a film forming polymer.

6. The method of claim 5, wherein the film forming polymer comprises polyurethanes, epoxy polymers, non-metal crosslinked acrylic polymers or a mixture thereof.

7. The method of claim 1, wherein the anti-slip agent comprises alkyl glycoside.

8. The method of claim 1, wherein the uncoated surface has a coefficient of friction of at least about 0.5 after the composition is applied to the uncoated surface.

9. The method of claim 1, wherein the surface has an increase in 60° gloss of at least about 20% after the composition is applied to the uncoated surface.

* * * * *